May 20, 1958  E. N. EKLUND  2,835,156
MACHINE-TOOL VISE HAVING WORKPIECE-CLAMPING
SCREW IN PROXIMITY TO BASE-CLAMPING SCREW
Filed June 26, 1956  2 Sheets-Sheet 1

INVENTOR
Elias Napoleon Eklund

BY

ATTORNEY

May 20, 1958 E. N. EKLUND 2,835,156
MACHINE-TOOL VISE HAVING WORKPIECE-CLAMPING
SCREW IN PROXIMITY TO BASE-CLAMPING SCREW
Filed June 26, 1956 2 Sheets-Sheet 2
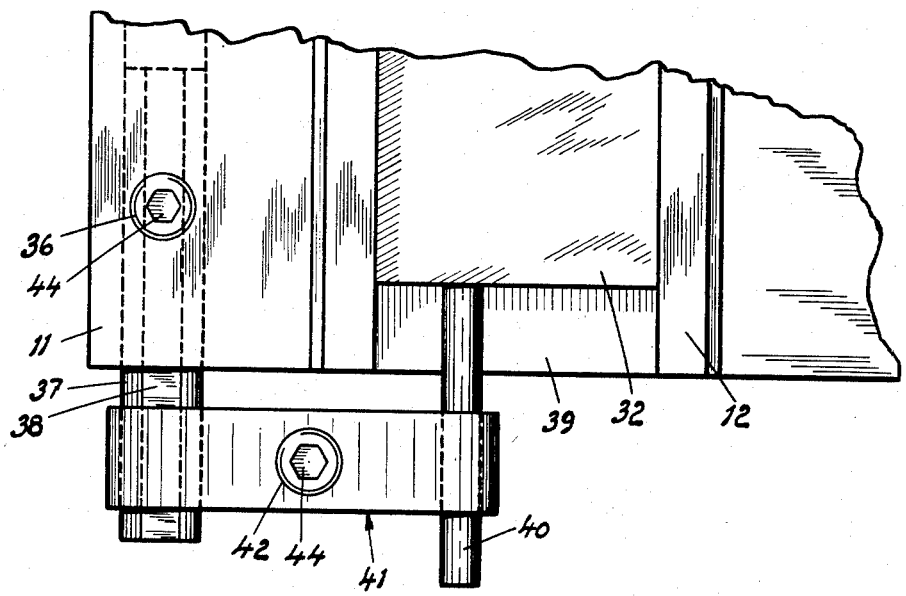
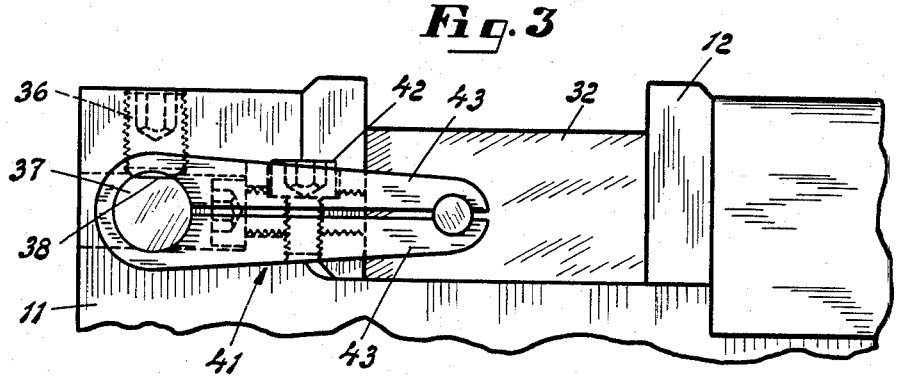
INVENTOR
Elias Napoleon Eklund
BY
ATTORNEY Patented May 20, 1958

2,835,156

MACHINE-TOOL VISE HAVING WORKPIECE-CLAMPING SCREW IN PROXIMITY TO BASE-CLAMPING SCREW

Elias Napoleon Eklund, Stockholm, Sweden, assignor to AB. E. N. Eklunds Mekaniska Verkstad, Stockholm, Sweden, a corporation of Sweden Application June 26, 1956, Serial No. 593,896

Claims priority, application Sweden June 30, 1955

5 Claims. (Cl. 81—41)

This invention relates to a machine-tool vise the body of which is provided with two jaws, one being fixed on the body and the other being adjustable on the body by means of a clamping spindle both in direction to and in the direction from the fixed jaw, which body is also turnable on a bottom plate. This kind of vise is further provided with a conical central part attachable to a bottom or base plate cooperating with a slotted clamping ring, those parts of which situated one on each side of the slot being arranged to be pressed towards each other by means of a clamping screw which is turnable by means of a crank in order to clamp the body to the bottom plate. In this way the adjusted body is prevented from being turned.

The clamping devices in previously known machine-tool vises are, however, very complicated which makes the assembling of the different parts of the machine-tool vises difficult and tedious, and the costs of manufacturing are rather high. Besides, the clamping devices must have a very accurate exactness. In these earlier known machine-tool vises the clamping screw has been arranged on the bottom plate. After the body has been turned to a certain position it has often been difficult to reach the clamping screw for the turning of the same. The present invention will eliminate this drawback. It is characterized by the fact that the clamping screw is turnably carried in the body and the outer end of said clamping screw is situated adjacent the outer end of the clamping spindle. The inner, threaded end of the clamping screw which freely passes through the part of the clamping ring situated on one side of the slot, engages threads in the part of the clamping ring situated on the other side of the slot, and the clamping screw is provided with a shoulder by means of which the clamping screw when it is tightened is able to press the part of the clamping ring having a cylindrical hole towards the part of the clamping ring having threads. Preferably approximately opposite said slot the clamping ring is fixed to the body by means of a key, pin or similar device, in such a way that the ring cannot be turned relatively to the body.

If the vise is arranged on a working table of a machine extending beyond the outline (in plan) of the vise itself, a crank which extends below the profile of the machine tool vise cannot be used for tightening the screw spindle. In such cases the screw spindle, and sometimes also the clamping screw, cannot be tightened by means of the crank but requires an angle-bent wrench one branch of which has a noncircular cross section fitting an axial notch of corresponding cross section in either the outer end of the screw spindle or in the outer end of the clamping screw. When the wrench is not in use, that part of it serving as a handle can be inserted in a clamping sleeve in the body. At the inner end the sleeve is provided with resilient tongues which resiliently and releasably keep the wrench in its inserted position.

If the machine-tool vise is to be used for a series of workpieces, it is advisable to provide the vise with an easily adjustable stop which makes it possible to clamp each of the workpieces in exactly the same position as the preceding workpiece. According to the invention, such a stop includes a boom extending in the transversal direction of the vise and adjustable and fixable in the longitudinal direction, a pin extending parallel to said boom into the space between the fixed and the movable jaws, and a clamp which is supported by the outer end of said boom. The clamp is preferably fork-shaped to provide two arms which can be pressed towards each other by means of a screw situated at the central part of the arms, connected ends of the arms having a bore in which the outer end of the boom is clamped and their opposite ends catching the pin in such a way that it will be parallel to the boom.

My invention will now be explained by referring to the accompanying drawings. In the drawings:

Figure 3 shows fragmentary, enlarged-scale side elevation of the fixed jaw and the movable jaw, and Figure 4 is a fragmentary plan view of Figure 3.

Figure 1:
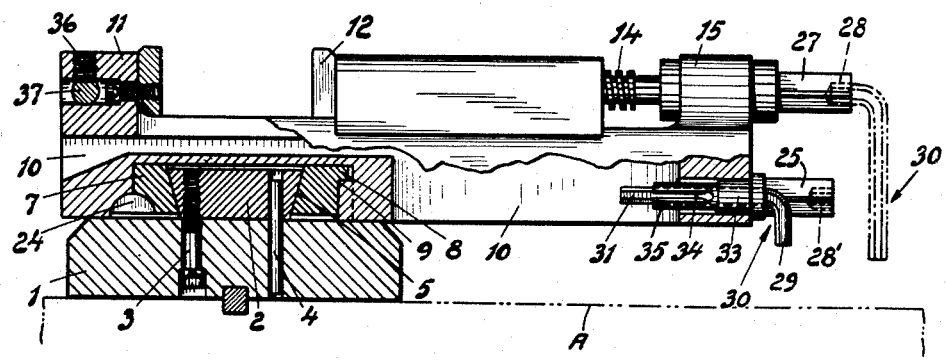
Figure 1 is a side elevation of a machine-tool vise according to the present invention, parts being broken away and shown in section.

According to the embodiment shown on the drawings the machine-tool vise is composed of a bottom plate 1 with a central part 2 which is attached to the bottom plate by means of a plurality of screws 3 and pins 4. A conical peripheral surface 5 of the central part decreases in diameter in the direction towards the bottom plate 1. The central part 2 is surrounded by a cylindrical clamping ring 7 which is provided with a lateral slot 6, and which has an inner peripheral surface that is sloped for mating contact with the peripheral surface 5 of the central part 2. This clamping ring 7 is provided with circumferentially spaced lugs 8 which engage behind inwardly directed projections 9 formed by bayonet-type slots in the lower part of the body 10 of the vise thereby forming a bayonet-type connection between the body 10 and the clamping ring 7. The body is provided with two jaws 11, 12. The jaw 11 is fixed and the jaw 12 is movable toward or away from the fixed jaw 11 by means of a screw spindle 14 which can be tightened by means of a crank 13. The screw spindle 14 is rotatably but axially unmovably carried in a fixed bearing 15 on the body 10. The parts of the clamping ring 7 situated at both sides of the slot 6 have the reference letters 16 and 17. The part 16 is provided with inner threads and the other part is provided with a bore 18 through which passes an inner, threaded end 19 of a clamping screw 20 which is turnably carried in the body 10 and which is parallel to the screw spindle 14. The inner end 19 is reduced in diameter with respect to a shank portion of the clamping screw 20 so as to provide a shoulder 21. A tubular spacer 23 is inserted between this shoulder 21 and a shoulder 22 on the part 17 of the clamping ring 7. Approximately diametrically opposite the slot the clamping ring 7 is fixed to the body 10 by means of a key 24 whereby the clamping ring is prevented from turning relative the body. The outer end of the clamping screw 20 is provided with a square head 25 for engagement by a square socket 26 of the crank 13 when it is desired to turn the clamping screw 20. An outer end of the screw spindle 14 is provided with a similar square head 27 in such a way that the same crank 13 can be selectively used for tightening the screw spindle 14 and the clamping screw 20. As the two heads 25 and 27 are situated adjacent each other, they can be easily operated from one and the same place.

When the body 10 has been turned to the desired position relatively to the bottom plate 1, the clamping screw 20 is tightened by means of the crank 13 whereby the parts 16 and 17 are pressed toward each other around the central part 2 and thus clamp the ring 7 thereto, whereby due to the peripheral conical surfaces, the body 10 tends to become wedged against the bottom plate 1. As the clamping ring 7 is keyed to the body 10, the vise will be fixed effectively in the adjusted position. The pitch of the threads of the clamping screw 20 should be chosen in such a way that the body 10 will be effectively clamped by turning the crank 13 only approximately a quarter or a third of a revolution.

In the shown embodiment there is provided an alternative crank means for a quick adjustment of the movable jaw. As obvious from Figures 1 and 2 the head 27 of the screw spindle 14 is provided with an axial socket 28 which has a noncircular, preferably a hexagonal, cross section, and which receives one arm 29 of an Allen wrench 30 the other arm of which serves as a handle. If the body 10 is clamped in such a position on the working table A of the machine tool that the crank 13 cannot be turned a complete revolution, and would thus have to be alternately removed and replaced for step by step rotation of the spindle 14, the Allen wrench 30 is used instead of the crank 13, and the screw spindle 14 is quickly turned by continuous manipulation of the wrench handle 31 to cause the jaw to be moved towards a workpiece 32 (Figure 4). For final clamping of the workpiece, the Allen wrench is replaced by the crank 13 since the spindle needs to be turned only a part of a revolution. If desired, the head 25 of the screw 20 may also be provided with a similar axial socket 28'.

Figure 2:
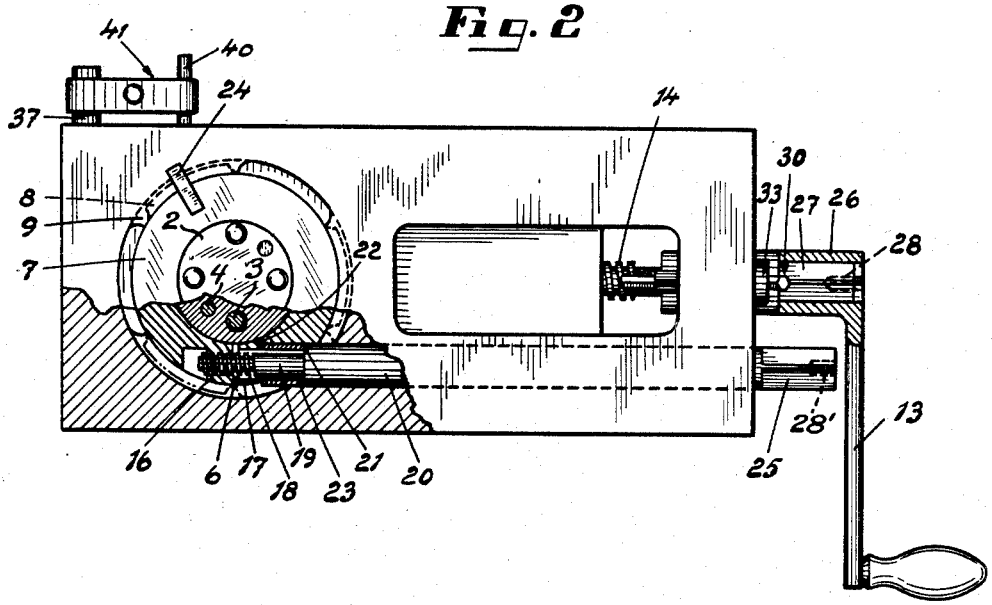
Figure 2 is a bottom view of Figure 1, but omits a bottom plate, although it shows in section one each of the screws and pins that attach the vise to the bottom plate, and has parts broken away and shown in section.

In order to prevent the lever 30 from getting lost when not in use, the vice is provided with a clamping sleeve 33 which is pressed into a bore in the body 10 and which is provided with an axial bore fitting the handle 31 of the wrench 30. The inner end of the sleeve 33 is provided with longitudinal slots 34 so as to form resilient tongues 35 which by means of friction grip the handle 31 and keep the wrench 30 releasably in a readiness position as shown in Figure 1.

As particularly obvious from Figures 3 and 4, the machine-tool vise may further be provided with a device for locating seriatim a series of equal-sized workpieces which can be clamped one at a time in exactly the same position, such devices being broadly known per se. This device, according to the invention, includes a boom 37 which extends from a transverse bore in the fixed jaw 11, which is axially movable and fixable in adjusted position by means of a locking screw 36 and which is provided with a longitudinal plane surface 38 against which the inner end of the locking screw 36 is pressed. One end of a pin 40 which is parallel to the boom 37 extends into a space 39 between the fixed jaw 11 and the movable jaw 12. The outer end of this pin 40 is fixed by means of a clamp 41 which consists of two arms 43 which by means of a screw 42 can be pressed toward each other. These two arms 43 are connected with each other at one end. Upon tightening the screw 42 not only the pin 40 is clamped between the arms 43 but the latter are also simultaneously clamped to the outer end of the boom 37 which thereby supports the clamp 41 and the pin 40.

Each one of the two screws 36 and 42 is provided with a hexagonal socket 44 into which fits the arm 29 of the wrench 30. It is thus possible by loosening the screw 36 by means of the wrench 30 to move the boom 37 together with the clamp 41 and the pin 40 in the transversal direction of the machine-tool vise to the desired position whereupon the screw 36 is tightened. The inner end of the pin 40 then serves as a stop whenever a workpiece is moved thereagainst. However, it is also possible to adjust only the pin 40 after the screw 42 has been loosened a little. In that case the clamp 41 remains in its position. If the clamp 41 and the pin 40 are not to be used, the clamp after the screw 36 has been loosened may be turned 180° around the axis of the boom 37 in such a way that the pin 40 no longer will be situated in the space 39. The stop device may be removed by pulling the boom 37 out of the bore in the fixed jaw 11.

The shown and described embodiment is to be regarded only as an example and particularly the embodiment of the clamping screw 20 and the clamping parts 16 and 17 of the ring 7 may be formed in many different ways within the scope of the invention. The tubular space 23 may even be dispensed with and the shoulder 21 of the clamping screw 20 may rest directly against the shoulder 22 of the clamping part 17. Other devices than the key 24, for example a pin, may be used for fixing the clamping ring 7 to the body 10.

What I claim is:

1. Improvements in a machine-tool vise, the body of which is provided with two jaws, one being fixed to the body and the other being by means of a screw spindle displaceable on the body toward and away from the fixed jaw, said body being turnable relatively to a bottom plate provided with a conical central part which is surrounded by a clamping ring provided with a transverse slot, the ring parts at both sides of said slot being capable of being pressed towards each other by means of a clamping screw which is turnable by means of a crank, thereby clamping the body to the bottom plate, said clamping screw being journalled in the body, and the outer end of said clamping screw being situated adjacent the outer end of said screw spindle.

2. Improvements in a machine-tool vise as recited in claim 1, an inner threaded end of said clamping screw being freely passed through a bore in the part of the clamping ring situated at one side of the slot in said clamping ring and being screwed into the part of the clamping ring situated at the other side of said slot, and the clamping screw being provided with a shoulder by means of which the clamping screw when tightened forces the part of the clamping ring provided with said bore toward the threaded part of the clamping ring.

3. Improvements in a machine-tool vise as recited in claim 2, and means disposed approximately opposite the slot to key said clamping ring to the body in such a way that said clamping ring cannot turn relatively to said body.

4. Improvements in a machine-tool vise as recited in claim 1, said screw spindle being arranged to be selectively turned by means of the crank and by means of an angle-bent wrench having a noncircular cross section so as to fit a correspondingly shaped axial socket in the screw spindle.

5. Improvements in a machine-tool vise as recited in claim 4, a clamping sleeve mounted in said body, a longer arm of the wrench serving as a handle, and said handle, when the wrench is out of use and is to be stored, being insertable in said clamping sleeve, an inner end of said sleeve being provided with resilient longitudinal tongues for frictionally retaining the wrench in its stored position.

References Cited in the file of this patent
UNITED STATES PATENTS

| | | |
|---|---|---|
| 668,695 | Stevens | Feb. 26, 1901 |
| 678,805 | Weyand | July 16, 1901 |
| 1,194,058 | Neumayer | Aug. 8, 1916 |

FOREIGN PATENTS

| | | |
|---|---|---|
| 556,116 | France | Apr. 7, 1923 |
| 615,451 | France | Oct. 11, 1926 |
| 263,354 | Switzerland | Nov. 16, 1949 |
| 1,099,898 | France | Mar. 23, 1955 |